(12) United States Patent
Hossain et al.

(10) Patent No.: US 11,175,734 B1
(45) Date of Patent: Nov. 16, 2021

(54) WRIST TRACKING DEVICES

(71) Applicant: Apple Inc., Cupertino, CA (US)

(72) Inventors: Muhammad F. Hossain, San Jose, CA (US); Gabriele D'Amone, Rome (IT); Stephen E. Dey, San Francisco, CA (US)

(73) Assignee: Apple Inc, Cupertino, CA (US)

( * ) Notice: Subject to any disclaimer, the term of this patent is extended or adjusted under 35 U.S.C. 154(b) by 0 days.

(21) Appl. No.: 16/983,999

(22) Filed: Aug. 3, 2020

Related U.S. Application Data

(60) Provisional application No. 62/906,641, filed on Sep. 26, 2019.

(51) Int. Cl.
*G06F 3/01* (2006.01)
*G06F 3/0487* (2013.01)

(52) U.S. Cl.
CPC ............ *G06F 3/012* (2013.01); *G06F 3/0487* (2013.01)

(58) Field of Classification Search
CPC ........ G06F 3/012; G06F 3/0487; G06F 3/017; G06F 1/163; G06F 3/011; G06F 3/014; G06F 3/0304; H04B 1/385; H04B 2001/3866; H04B 2001/3861; H04B 2001/3855; H04W 4/80; G09G 2370/16; A63F 13/213; A63F 2300/1087; A63F 2300/303; A63F 2300/1031; A63F 2300/308; A63F 13/212; A63F 2300/8082; A61B 5/681; A61B 5/6824; G02B 27/017; G02B 2027/0178; G02B 2027/0187; G02B 27/0093; G02B 2027/0138; G06T 19/006; A44C 5/14; A44C 5/00
See application file for complete search history.

(56) References Cited

U.S. PATENT DOCUMENTS

| | | | |
|---|---|---|---|
| 8,179,604 B1 * | 5/2012 | Prada Gomez | G02B 27/0093 359/630 |
| 10,620,711 B2 | 4/2020 | Stafford et al. | |
| 2011/0199303 A1 * | 8/2011 | Simpson | G06F 3/014 345/158 |
| 2015/0258431 A1 * | 9/2015 | Stafford | A63F 13/5255 463/31 |
| 2015/0031299 A1 | 12/2015 | Holman et al. | |
| 2016/0187974 A1 * | 6/2016 | Mallinson | A63F 13/5255 463/32 |
| 2016/0313801 A1 | 10/2016 | Wagner et al. | |
| 2016/0361637 A1 * | 12/2016 | Higgins | A63F 13/24 |

(Continued)

*Primary Examiner* — Temesghen Ghebretinsae
*Assistant Examiner* — Ivelisse Martinez Quiles
(74) *Attorney, Agent, or Firm* — Morgan, Lewis & Bockius LLP

(57) ABSTRACT

A head-mountable device can be operated with devices worn on wrists, arms, hands, and/or other limbs of a user. Such devices can provide indicators that allow a head-mountable device to determine both an identity and a characteristic (e.g., position, orientation, distance, etc.) of the devices and therefore the user. The information regarding the tracking devices and/or the hands can be used to produce a virtual representation of the hands or otherwise be used to receive and interpret gestures as user input. The devices that facilitate such tracking can be worn in a variety or arrangements depending on whether the tracking is to be performed. As such, they can be compactly stored in a manner that allows them to be readily accessible for deployment.

20 Claims, 5 Drawing Sheets

(56) References Cited

U.S. PATENT DOCUMENTS

| | | | |
|---|---|---|---|
| 2017/0168592 A1* | 6/2017 | Mishyn | G06F 3/0308 |
| 2017/0285756 A1* | 10/2017 | Wang | G06F 3/0346 |
| 2018/0150131 A1* | 5/2018 | Ranieri | G06F 3/011 |
| 2018/0210491 A1* | 7/2018 | Song | G04G 17/06 |

* cited by examiner

WRIST TRACKING DEVICES

CROSS-REFERENCE TO RELATED APPLICATION

This application claims the benefit of U.S. Provisional Application No. 62/906,641, entitled "WRIST TRACKING DEVICES," filed Sep. 26, 2019, the entirety of which is incorporated herein by reference.

TECHNICAL FIELD

The present description relates generally to tracking devices worn by a user, and, more particularly, to wrist tracking devices for detection by head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
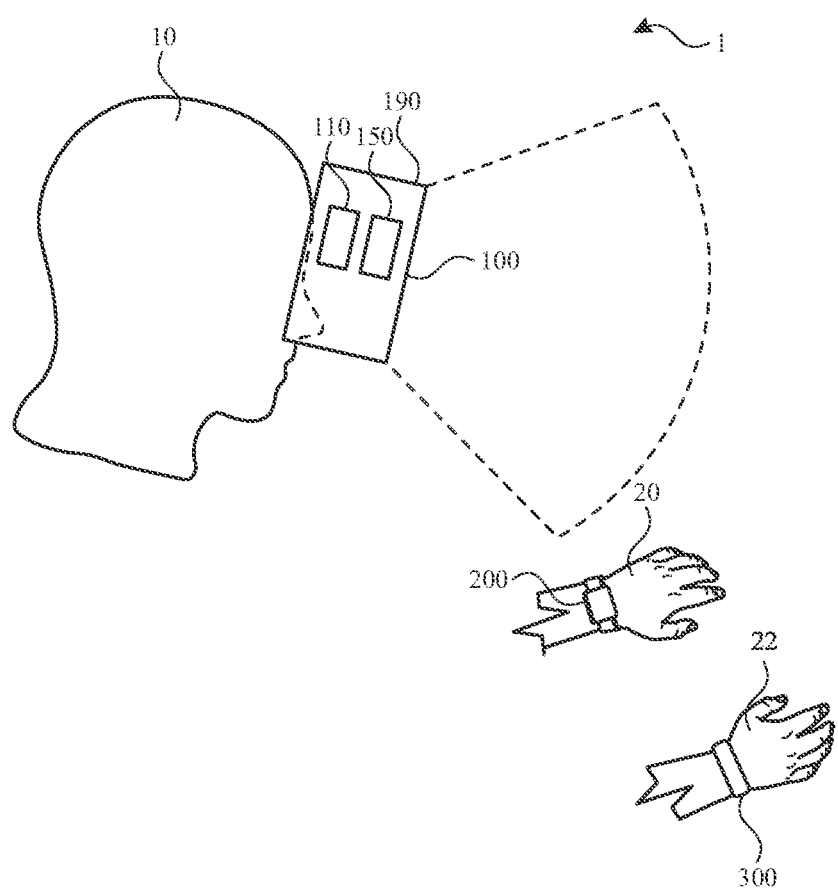
FIG. 1 illustrates a view of a head-mountable device and tracking devices on a user's wrists, in accordance with some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Head-mountable devices can be equipped with a wide range of outward and inward facing sensors. These sensors can recognize and track objects, surfaces, and user gestures such as hand and body movements. The functionality of such sensors can be limited by factors such as component cost, device size, device weight, heat generation, available computing power, and/or occlusion due to the device being in a specific location relative to other objects or users.

Head-mountable devices can collect data from and/or relating to a device and make certain determinations that aid the process of displaying a representation (e.g., virtual rendering) to the user. For example, an object can be provided with indicators that allow a head-mountable device to determine both an identity and a characteristic (e.g., position, orientation, distance, etc.) of the object.

By further example, the user's hands, arms, or other limbs can be recognizable by a head-mountable device by being attached to one or more tracking devices in a manner that maintains a fixed relative position and orientation between the user's hands and the corresponding tracking devices. The head-mountable device can determine both an identity and a characteristic (e.g., position, orientation, distance, etc.) of the tracking devices, and therefor the hands. The information regarding the tracking devices and/or the hands can be used to produce a virtual representation of the hands or otherwise be used to receive and interpret gestures as user input.

Rather than requiring a head-mountable device to directly identify and analyze each hand independently, analysis of a tracking device worn by the user can provide sufficient constraints to determine characteristics of the hands, without requiring that the hands be independently analyzed. With such analysis, the speed and accuracy of object recognition, hand and body tracking, surface mapping, and/or digital reconstruction can be improved. The devices that facilitate such tracking can be worn in a variety or arrangements depending on whether the tracking is to be performed. As such, they can be compactly stored in a manner that allows them to be readily accessible for deployment.

These and other embodiments are discussed below with reference to FIGS. 1-10. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 190 that is worn on a head of a user. The frame 190 can be positioned in front of the eyes of a user to provide information within a field of view of the user. The frame 190 can provide nose pads or another feature to rest on a user's nose. The frame 190 can be supported on a user's head with a securement element. The securement element can wrap or extend along opposing sides of a user's head. The securement element can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element can include multiple components to engage a user's head.

The frame 190 can provide structure around a peripheral region thereof to support any internal components of the frame 190 in their assembled position. For example, the frame 190 can enclose and support various internal components (including for example integrated circuit chips, processors, memory devices and other circuitry) to provide computing and functional operations for the head-mountable device 100, as discussed further herein. Any number of components can be included within and/or on the frame 190 and/or the securement element and be operably connected to each other.

The frame 190 can include and/or support one or more cameras 150. The cameras 150 can be positioned on or near an outer side of the frame 190 to capture images of views external to the head-mountable device 100. The captured images can be used for display to the user or stored for any other purpose. Additionally or alternatively, other sensors, input devices, and/or output devices can be positioned at or on an exterior side of the frame 190.

The head-mountable device 100 of a system 1 can be used in conjunction with a watch 200, a wrist tracking device 300, and/or another tracking device. The head-mountable device 100 can operate the camera 150 in a manner that captures one or more views of the watch 200, a wrist tracking device 300, another tracking device, and/or the hands 20 and 22 within a field of view of the camera 150. The captured images can be produced on the display 110 of the head-mountable device 100 for observation by the user 10. As used herein, a camera is a device that can optically capture a view of an environment (e.g., within and/or outside the visible spectrum of light). Additionally or alternatively, the head-mountable device 100 can communicate with the watch 200, the wrist tracking device 300, and/or another tracking device. The head-mountable device 100 can provide one or more outputs to the user based on information gathered relating to the watch 200, a wrist tracking device 300, another tracking device, and/or the hands 20 and 22. The user can observe the watch 200, a wrist tracking device 300, another tracking device, the hands 20 and 22, and/or representations thereof through the display 110 of the head-mountable device 100, as discussed further herein.

The display 110 can optionally transmit light from a physical environment for viewing by the user. Such a display 110 can include optical properties, such lenses for vision correction based on incoming light from the physical environment. Additionally or alternatively, the display 110 can provide information as a display within a field of view of the user. Such information can be provided to the exclusion of a view of a physical environment or in addition to (e.g., overlaid with) a physical environment. Additionally or alternatively, other sensors, input devices, and/or output devices can be positioned at or on an interior side of the frame 190.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
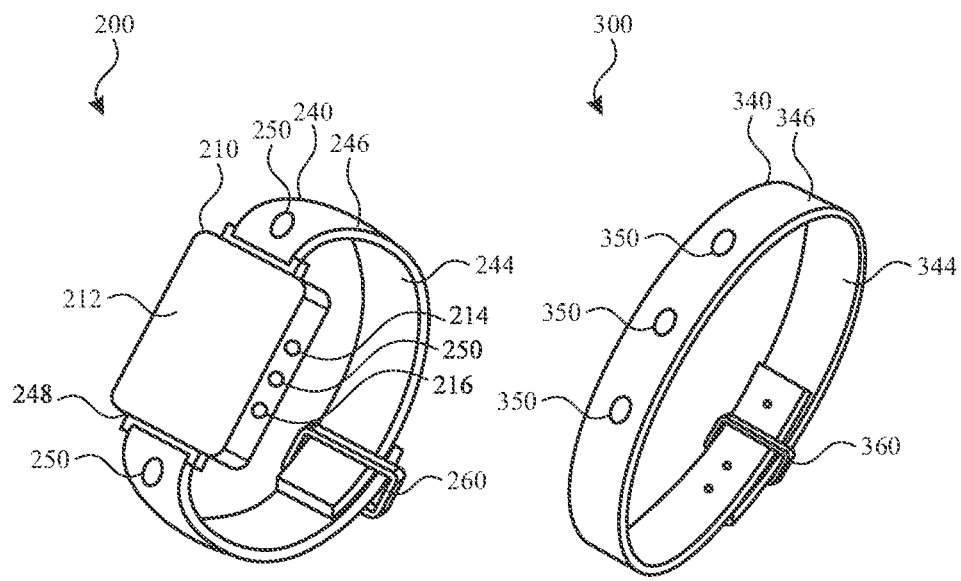
FIG. 2 illustrates a perspective view of a watch and a wrist tracking device, in accordance with some embodiments of the present disclosure.
Figure 3:
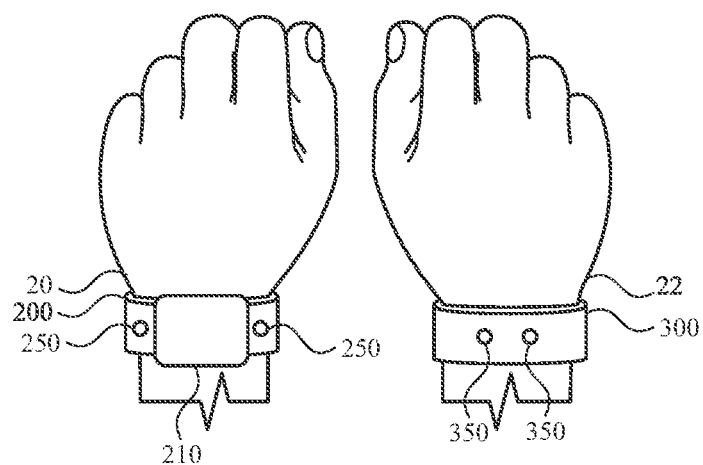
FIG. 3 illustrates a top view of the watch and the wrist tracking device of FIG. 2 on wrists of a user, in accordance with some embodiments of the present disclosure.

Referring now to FIGS. 2 and 3, a watch and a wrist tracking device can be used in concert to track a user's movements. As shown in FIG. 2, a watch 200 and a wrist tracking device 300 can be separate devices that provide detectable features for tracking each of a user's wrists, hands, arms, or other limbs.

FIG. 2 illustrates a perspective view of a watch 200, including the watch body 210 and a watch band 240. As shown in FIG. 2, the watch body 210 includes a housing that supports the display 212. The watch body 210 can be worn on a user's wrist and secured thereto by the watch band 240. The watch band 240 can be a continuous structure or assembled as separate portions (e.g., straps) that join together and provide adjustable size configurations. For example, a clasp 260 or another mechanism (e.g., buckles, buttons, latches, locks, snaps, threads, and/or pins) can be provided to adjustably connect separate portions of the watch band 240.

The watch band 240 can include attachment members (e.g., lugs) at opposing ends of the watch band 240 that fit within respective recesses or channels of the watch body 210 and allow the watch band 240 to be removably attached to the watch body 210 at one or more interfaces 248. The attachment members may be part of the watch band 240 or may be separable (and/or separate) from the watch band 240. Generally, the attachment members may lock into the channels and thereby maintain connection between the watch band 240 and the watch body 210. The user may release a locking mechanism (not shown) to permit the attachment members to slide or otherwise move out of the channels. In some watches, the channels may be formed in the watch band 240 and the attachment members may be affixed or incorporated into the watch body 210. It will be recognized that other attachment features, such as locks, latches, snaps, clasps, threads, and/or pins can be included on the watch band 240 for securely attaching to the watch body 210. The interface 248 may be a pivotable (e.g., stem and tube) interface that allows watch band 240 to rotate with respect to watch body 210, an adhesive or molded attachment between watch band 240 and watch body 210, or another suitable mechanical coupling. The interface 248 may include an electrical connector interface between circuitry within watch band 240 and circuitry within watch body 210. The circuitry may include a main processor, specialized integrated circuits, a battery, antennas and/or other communications circuitry disposed within watch body 210, as discussed further herein. Processing circuitry such as the main processor of circuitry for watch 200 may be communicatively coupled, via the interface 248, to components (e.g., indicators, etc.) disposed on and/or within the watch band 240.

The watch body 210 can include components for interacting with a user. For example, the display 212 may provide an image or video output for the watch body 210. The display 212 may also provide an input surface for one or more input devices such as a touch sensing device, force sensing device, temperature sensing device, and/or a fingerprint sensor. The display 212 may be any size suitable for inclusion at least partially within the housing of the watch body 210 and may be positioned substantially anywhere on the watch body 210. The watch body 210 can further include one or more other input/output components 214, for receiving input from and/or providing output to a user. For example, one or more buttons, dials, crowns, switches, or other devices can be provided for receiving input from a user. The input/output component 214 can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock. The watch body 210 can further include one or more sensors 216, as discussed further herein.

The watch body 210 and/or the watch band 240 can provide one or more watch indicators 250 for detection by another device. The watch band 240 includes an inner surface 244 (e.g., an inner surface configured to contact at least portions of the user's wrist when watch 200 is worn on the user's wrist). The inner surface 244 is opposite an outer surface 246. In FIG. 2, two watch indicators 250 are shown as disposed on the outer surface 246 of the watch band 240 and one watch indicator 250 is disposed on the watch body 210. However, this is merely illustrative. In various implementations, the watch 200 may be provided with 1, 2, 3, 4, 5, 6, 7, 8, 9, 10, or more than 10 watch indicators 250 on the watch body 210 and/or the watch band 240. The watch indicators 250 can be evenly or otherwise distributed around the length formed by the watch body 210 and/or the watch band 240. Additionally or alternatively, the watch indicators 250 can be unevenly distributed (e.g., concentrated in locations at which detection is more likely to be made by an external device).

The watch indicators 250 can include features that are detectable by a head-mountable device or another external device. The watch indicators 250 can be used to identify the watch 200 to a head-mountable device. As shown in FIG. 2, the watch indicators 250 can be provided at different regions of the watch 200. The watch indicators 250 can include one or more emitters that can produce an output, such as light, sound, electromagnetic radiation, and the like. In some embodiments, the watch indicators 250 can include light emitters that emit light that is optically detectable by an external device. While one type of indicator is illustrated, it will be recognized that one or more of various kinds of indicators can be employed. For example, indicators can include emitters, patterns, symbols, text (alpha and/or numeric), images, barcodes (e.g., Universal Product Code), QR codes, and the like. Such indicators may be formed as patterns of contrasting dark (e.g., black) and light (e.g., white) portions. It will be understood that such symbols can be provided within or outside the visible spectrum of the human eye. Where the watch indicators 250 emit or reflect light outside of the visible spectrum, it can be non-visible to a user. For example, the watch indicators 250 can include ultraviolet and/or infrared light emitters. By further example, the watch indicators 250 can include ultraviolet-reflective ink and/or infrared-reflective ink. As such, the watch indicators 250 can provide identification capabilities without being noticeable by a user. At least some of the watch indicators 250 can be the same as or different than each other. Accordingly, the type and/or arrangement of the watch indicators 250 can be used as a basis for identifying the watch 200 and/or a characteristic (e.g., position and/or orientation) thereof.

FIG. 2 further illustrates a perspective view of a wrist tracking device 300, including a wrist tracking device band 340. As further shown in FIG. 2, the wrist tracking device band 340 can be a continuous structure or assembled as separate portions (e.g., straps) that join together and provide adjustable size configurations. For example, a clasp 360 or another mechanism (e.g., buckles, buttons, latches, locks, snaps, threads, and/or pins) can be provided to adjustably connect separate portions of the wrist tracking device band 340.

The wrist tracking device band 340 can provide one or more wrist tracking device indicators 350 for detection by another device. The wrist tracking device band 340 includes an inner surface 344 (e.g., an inner surface configured to contact at least portions of the user's wrist when wrist tracking device 300 is worn on the user's wrist). The inner surface 344 is opposite an outer surface 346. In FIG. 2, three wrist tracking device indicators 350 are shown as disposed on the outer surface 346 of the wrist tracking device band 340. However, this is merely illustrative. In various implementations, the wrist tracking device 300 may be provided with 1, 2, 3, 4, 5, 6, 7, 8, 9, 10, or more than 10 wrist tracking device indicators 350 on the wrist tracking device band 340. The wrist tracking device indicators 350 can be evenly or otherwise distributed around the length formed by the wrist tracking device band 340. Additionally or alternatively, the wrist tracking device indicators 350 can be unevenly distributed (e.g., concentrated in locations at which detection is more likely to be made by an external device).

The wrist tracking device indicators 350 can include features that are detectable by a head-mountable device or another external device. The wrist tracking device indicators 350 can be used to identify the wrist tracking device 300 to a head-mountable device. As shown in FIG. 2, the wrist tracking device indicators 350 can be provided at different regions of the wrist tracking device 300. The wrist tracking device indicators 350 can include one or more emitters that can produce an output, such as light, sound, electromagnetic radiation, and the like. In some embodiments, the wrist tracking device indicators 350 can include light emitters that emit light that is optically detectable by an external device. While one type of indicator is illustrated, it will be recognized that one or more of various kinds of indicators can be employed. For example, indicators can include emitters, patterns, symbols, text (alpha and/or numeric), images, barcodes (e.g., Universal Product Code), QR codes, and the like. Such indicators may be formed as patterns of contrasting dark (e.g., black) and light (e.g., white) portions. It will be understood that such symbols can be provided within or outside the visible spectrum of the human eye. Where the wrist tracking device indicators 350 emit or reflect light outside of the visible spectrum, it can be non-visible to a user. For example, the wrist tracking device indicators 350 can include ultraviolet and/or infrared light emitters. By further example, the wrist tracking device indicators 350 can include ultraviolet-reflective ink and/or infrared-reflective ink. As such, the wrist tracking device indicators 350 can provide identification capabilities without being noticeable by a user. At least some of the wrist tracking device indicators 350 can be the same as or different than each other. Accordingly, the type and/or arrangement of the wrist tracking device indicators 350 can be used as a basis for identifying the wrist tracking device 300 and/or a characteristic (e.g., position and/or orientation) thereof.

As shown in FIG. 3, the watch 200 and the wrist tracking device 300 can be used in concert to track each of a user's wrists, hands, arms, or other limbs. For example, the watch 200 can be worn on a first wrist 20 of the user and the wrist tracking device 300 can be worn on a second wrist 22 of the user. The watch indicators 250 of the watch 200 can be detected by an external device (e.g., a head-mountable device) to determine a characteristic (e.g., position and/or orientation) of the first wrist 20. The wrist tracking device indicators 350 of the wrist tracking device 300 can be detected by an external device (e.g., a head-mountable device) to determine a characteristic (e.g., position and/or orientation) of the second wrist 22. The detected characteristics of the wrists 20 and 22 can be detected and interpreted as user inputs for operation of the external device. Such external devices can include head-mountable devices, a smartphone, a remote computer, a gaming system, a television, a virtual reality system, a mixed reality system, and/or an augmented reality system. For example, the characteristics and/or changing characteristics of the wrists can be interpreted as user gestures to control one or more operations of the external device. The external device and/or another device can provide feedback to the user by confirming receipt of the inputs and/or executing an operation that corresponds to the user input. Inputs can be single-hand gesture inputs or combined two-hand gesture inputs.

The watch indicators 250 and the wrist tracking device indicators 350 can be arranged in a manner that is detectable by a head-mountable device. Furthermore, the arrangement of the watch indicators 250 and the wrist tracking device indicators 350 can be recognizable by the head-mountable device in a manner that identifies each of the watch 200 and the wrist tracking device 300. As such, an arrangement and/or output of the watch indicators 250 on the watch 200 can be different from an arrangement and/or output of wrist tracking device indicators 350 on the wrist tracking device 300. Accordingly, the arrangement and/or output can be used as an identifier to allow a head-mountable device to identify the watch 200 and the wrist tracking device 300. Information regarding the type of device can then be retrieved and applied by the head-mountable device, for example for visual representation thereof. Such information can relate to static features of the device, such as size, shape, color, and the like. It will be appreciated that a static feature is one that does not change during operation of the corresponding device.

The watch indicators 250 and wrist tracking device indicators 350 can be recognizable by the head-mountable device to determine a characteristic of the watch 200 and the wrist tracking device 300. For example, the indicators can be used to determine dynamic characteristics of the watch 200 and the wrist tracking device 300, such as position, orientation, distance from the head-mountable device, configuration, state, and the like. It will be understood that such dynamic characteristics can change over time. As such, it can be useful to determine such characteristics so that information relating to the identity of the watch 200 and the wrist tracking device 300 can be applied in a manner that facilitates accurate representation (e.g., virtual rendering) of the watch 200 and the wrist tracking device 300 and/or portions of the user by the head-mountable device. Such representation can be updated repeatedly, periodically, or constantly based on updated detections of the indicators.

Where each of the indicators is located at a known portion of the corresponding device (e.g., on a band), a head-mountable device can identify the location and/or orientation of each indicator within its field of view to determine the location of the corresponding portion within a field of view of the head-mountable device. The relative spatial relationships of the indicators within the field of view can also facilitate determination of the orientation of the corresponding devices relative to the head-mountable device. The relative positions of the indicators within the field of view can also facilitate determination of a distance between the devices and the head-mountable device.

Figure 4:
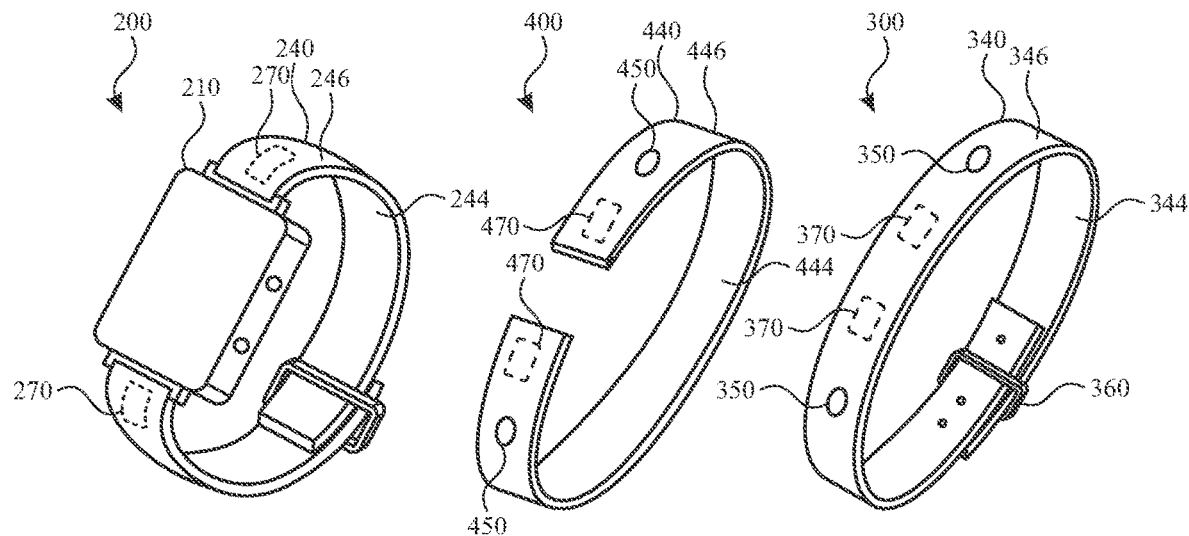
FIG. 4 illustrates a perspective view of a watch, a switchable tracking device, and a wrist tracking device, in accordance with some embodiments of the present disclosure.
Figure 5:
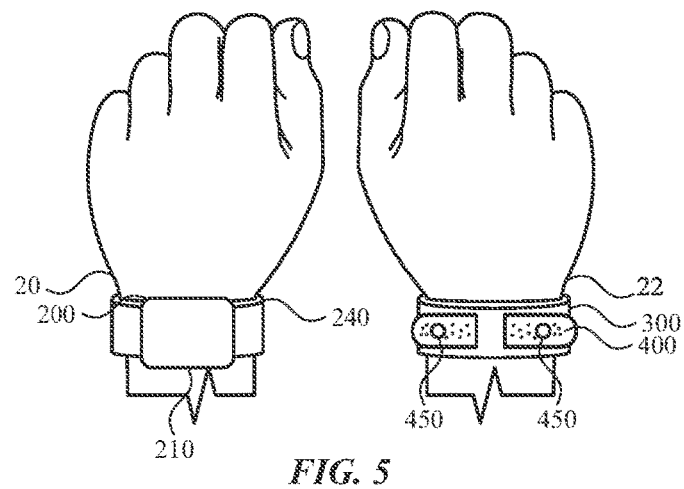
FIG. 5 illustrates a top view of the watch of FIG. 4 on a wrist of a user and the switchable tracking device and the wrist tracking device of FIG. 4 on another wrist of the user, in accordance with some embodiments of the present disclosure.
Figure 6:
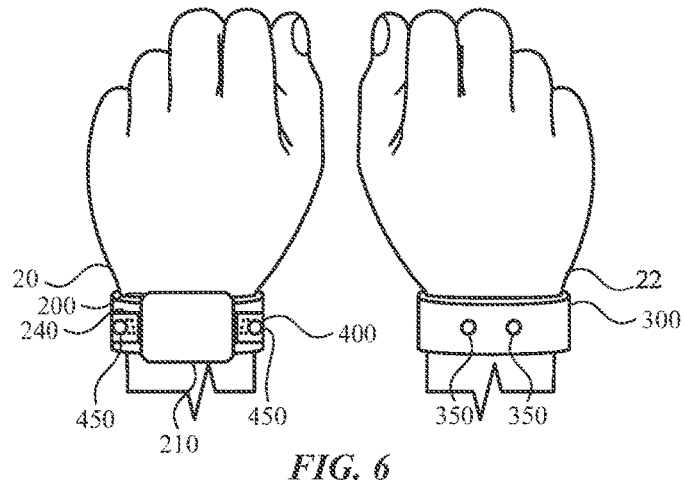
FIG. 6 illustrates a top view of the watch and the switchable tracking device of FIG. 4 on a wrist of a user and the wrist tracking device of FIG. 4 on another wrist of the user, in accordance with some embodiments of the present disclosure.

Referring now to FIGS. 4-6, a watch, a wrist tracking device, and a switchable tracking device can be used in concert to track a user's movements. As shown in FIG. 4, a watch 200, a wrist tracking device 300, and a switchable tracking device 400 can be separate devices that provide detectable features for tracking each of a user's wrists, hands, arms, or other limbs.

FIG. 4 illustrates a perspective view of the watch 200, including the watch body 210 and a watch band 240. It will be recognized that the watch 200 can optionally have the same features as the watch 200 of FIG. 2. Accordingly, a separate description of such features is not provided herein. As further shown in FIG. 4, the watch 200 can optionally omit some or all of the indicators described herein with respect to the watch 200 of FIG. 2. As further shown in FIG. 4, the watch 200 can include watch engagement elements 270 for engaging corresponding portions of the switchable tracking device 400, as described further herein.

FIG. 4 further illustrates a perspective view of a wrist tracking device 300, including a wrist tracking device band 340. It will be recognized that the wrist tracking device 300 can optionally have the same features as the wrist tracking device 300 of FIG. 2. Accordingly, a separate description of such features is not provided herein. As further shown in FIG. 4, the wrist tracking device 300 can include wrist tracking device engagement elements 370 for engaging corresponding portions of the switchable tracking device 400, as described further herein.

FIG. 4 further illustrates a perspective view of a switchable tracking device 400, including a switchable tracking device band 440. The switchable tracking device band 440 can be a semi-rigid structure that is arranged such that opposing ends have a resting position separated by a gap. In this way, the switchable tracking device band 440 can have a form in which the user's hand can pass through the gap or the space at least partially enclosed by the switchable tracking device band 440. The switchable tracking device band 440 can elastically recover to secure the switchable tracking device 400 to the user's wrist or another device.

The switchable tracking device band 440 can provide one or more switchable tracking device indicators 450 for detection by another device. The switchable tracking device band 440 includes an inner surface 444 (e.g., an inner surface configured to contact at least portions of the user's wrist when switchable tracking device 400 is worn on the user's wrist). The inner surface 444 is opposite an outer surface 446. In FIG. 2, two switchable tracking device indicators 450 are shown as disposed on the outer surface 446 of the switchable tracking device band 440. However, this is merely illustrative. In various implementations, the switchable tracking device 400 may be provided with 1, 2, 3, 4, 5, 6, 7, 8, 9, 10, or more than 10 switchable tracking device indicators 450 on the switchable tracking device band 440. The switchable tracking device indicators 450 can be evenly or otherwise distributed around the length formed by the switchable tracking device band 440. Additionally or alternatively, the switchable tracking device indicators 450 can be unevenly distributed (e.g., concentrated in locations at which detection is more likely to be made by an external device).

The switchable tracking device indicators 450 can include features that are detectable by a head-mountable device or another external device. The switchable tracking device indicators 450 can be used to identify the switchable tracking device 400 to a head-mountable device. As shown in FIG. 4, the switchable tracking device indicators 450 can be provided at different regions of the switchable tracking device 400. The switchable tracking device indicators 450 can include one or more emitters that can produce an output, such as light, sound, electromagnetic radiation, and the like. In some embodiments, the switchable tracking device indicators 450 can include light emitters that emit light that is optically detectable by an external device. While one type of indicator is illustrated, it will be recognized that one or more of various kinds of indicators can be employed. For example, indicators can include emitters, patterns, symbols, text (alpha and/or numeric), images, barcodes (e.g., Universal Product Code), QR codes, and the like. Such indicators may be formed as patterns of contrasting dark (e.g., black) and light (e.g., white) portions. It will be understood that such symbols can be provided within or outside the visible spectrum of the human eye. Where the switchable tracking device indicators 450 emit or reflect light outside of the visible spectrum, it can be non-visible to a user. For example, the switchable tracking device indicators 450 can include ultraviolet and/or infrared light emitters. By further example, the switchable tracking device indicators 450 can include ultraviolet-reflective ink and/or infrared-reflective ink. As such, the switchable tracking device indicators 450 can provide identification capabilities without being noticeable by a user. At least some of the switchable tracking device indicators 450 can be the same as or different than each other. Accordingly, the type and/or arrangement of the switchable tracking device indicators 450 can be used as a basis for identifying the switchable tracking device 400 and/or a characteristic (e.g., position and/or orientation) thereof.

As further shown in FIG. 4, the switchable tracking device 400 can include switchable tracking device engagement elements 470 for engaging the watch engagement elements 270 of the watch 200 and/or the wrist tracking device engagement elements 370 of the wrist tracking device 300. The watch engagement elements 270, the wrist tracking device engagement elements 370, and the switchable tracking device engagement elements 470 can include one or more mechanisms to releasably lock the switchable tracking device 400 to the watch 200 or the wrist tracking device 300. Such mechanisms can include locks, latches, snaps, screws, clasps, threads, magnets, pins, an interference (e.g., friction) fit, knurl presses, bayoneting, hook and loop fasteners, and/or combinations thereof. The switchable tracking device engagement elements 470 can optionally remain locked to the watch engagement elements 270 or the wrist tracking device engagement elements 370 until a release mechanism is actuated. The release mechanism can be provided on an outer surface of the watch 200, the wrist tracking device 300, and/or the switchable tracking device 400 for access by a user. For example, the release mechanism can be provided on an outer surface of the watch band 240, the wrist tracking device band 340, and/or the switchable tracking device band 440.

As shown in FIGS. 5 and 6, the watch 200, the wrist tracking device 300, and the switchable tracking device 400 can be used in concert to track each of a user's wrists, hands, arms, or other limbs. For example, as shown in FIG. 5, the watch 200 can be worn on a first wrist 20 of the user and the wrist tracking device 300 and the switchable tracking device 400 can be worn on a second wrist 22 of the user. In this configuration, the switchable tracking device 400 can at least partially overlapped the wrist tracking device 300 to minimize the amount of coverage on the user. For example, the switchable tracking device 400 can cover at least some of the indicators of the wrist tracking device 300. Corresponding engagement elements can couple the switchable tracking device 400 to the wrist tracking device 300 until released by a user. Additionally or alternatively, the switchable tracking device 400 and the wrist tracking device 300 can be operably connected by a communication interface that facilitates power and/or information exchange there between. Because this configuration is one in which the wrists are not both tracked, the indicators of the wrist tracking device 300 and the switchable tracking device 400 can remain dormant. For example, one or both of the wrist tracking device 300 and the switchable tracking device 400 can detect the proximity of the other and disable the activity of the indicators thereof to conserve power. Such an operation can be automated and/or based on user input.

As shown in FIG. 6, the switchable tracking device 400 can be removed from the wrist tracking device 300 and/or the second wrist 22 of the user. The switchable tracking device 400 can further be coupled to the watch 200 and/or the first wrist 20 of the user. In this configuration, the switchable tracking device 400 can at least partially overlapped the watch 200 to minimize the amount of coverage on the user. For example, the switchable tracking device 400 can cover at least some of the watch band 240 of the watch 200. The watch body 210 can remain uncovered by the switchable tracking device 400 (e.g., within a gap formed by the switchable tracking device band 440), so that the user can provide inputs and/or receive output at the watch body 210. Corresponding engagement elements can couple the switchable tracking device 400 to the watch 200 until released by a user. Additionally or alternatively, the switchable tracking device 400 and the watch 200 can be operably connected by a communication interface that facilitates power and/or information exchange there between. Because this configuration is one in which the wrists are both tracked, the indicators of the wrist tracking device 300 and the switchable tracking device 400 can be active. For example, one or both of the wrist tracking device 300 and the switchable tracking device 400 can detect the absence of the other and activate the indicators thereof to provide detection capabilities. Such an operation can be automated and/or based on user input.

While in the configuration illustrated in FIG. 6, the switchable tracking device indicators 450 of the switchable tracking device 400 can be detected by an external device (e.g., a head-mountable device) to determine a characteristic (e.g., position and/or orientation) of the first wrist 20. The wrist tracking device indicators 350 of the wrist tracking device 300 can be detected by an external device (e.g., a head-mountable device) to determine a characteristic (e.g., position and/or orientation) of the second wrist 22.

The switchable tracking device indicators 450 and the wrist tracking device indicators 350 can be arranged in a manner that is detectable by a head-mountable device. Furthermore, the arrangement of the switchable tracking device indicators 450 and the wrist tracking device indicators 350 can be recognizable by the head-mountable device in a manner that identifies each of the switchable tracking device 400 and the wrist tracking device 300. As such, an arrangement and/or output of the switchable tracking device indicators 450 on the switchable tracking device 400 can be different from an arrangement and/or output of wrist tracking device indicators 350 on the wrist tracking device 300. Accordingly, the arrangement and/or output can be used as an identifier to allow a head-mountable device to identify the switchable tracking device 400 and the wrist tracking device 300. The detected identities and/or characteristics of the switchable tracking device 400, wrist tracking device 300, and/or wrists 20 and 22 can be detected and interpreted as user inputs for operation of the external device, as described herein with respect to the indicators and devices of FIG. 3.

Figure 7:
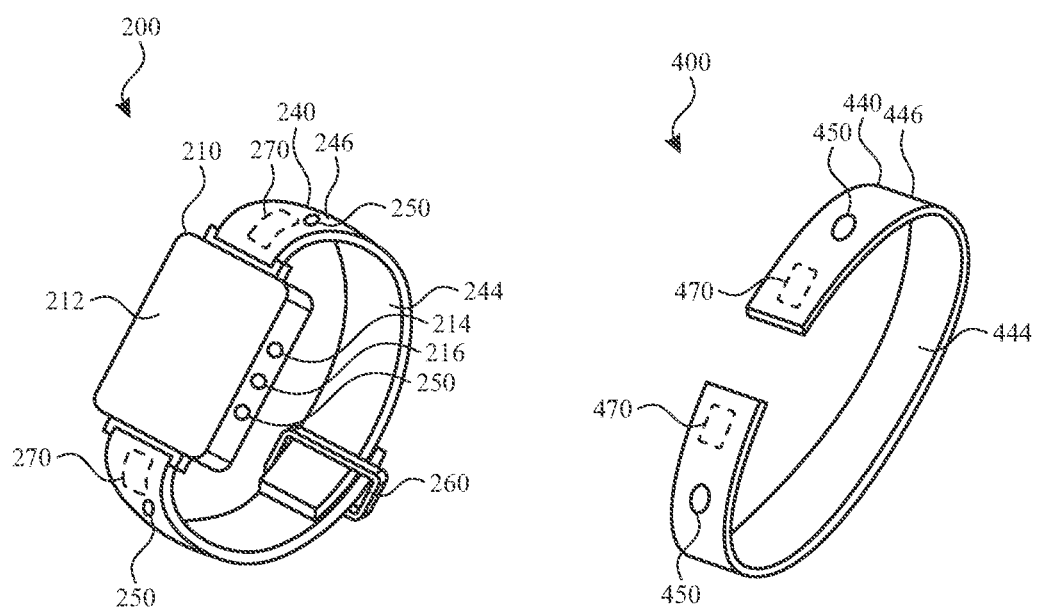
FIG. 7 illustrates a perspective view of a watch and a switchable tracking device, in accordance with some embodiments of the present disclosure.
Figure 8:
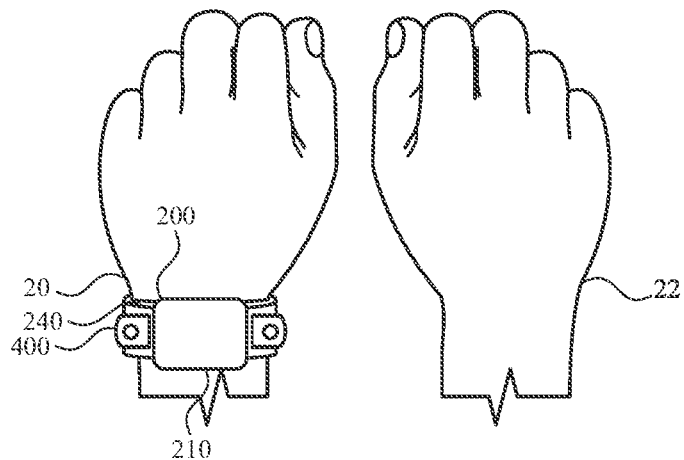
FIG. 8 illustrates a top view of the watch and the switchable tracking device of FIG. 7 on a wrist of a user, in accordance with some embodiments of the present disclosure.
Figure 9:
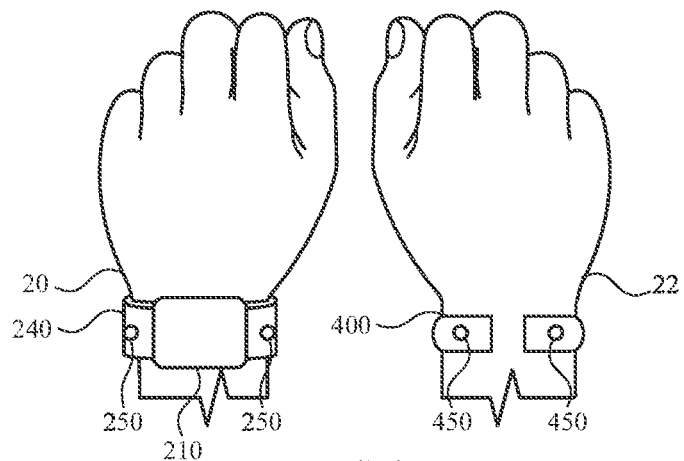
FIG. 9 illustrates a top view of the watch of FIG. 7 on a wrist of a user and the switchable tracking device of FIG. 7 on another wrist of the user, in accordance with some embodiments of the present disclosure.

Referring now to FIGS. 7-9, a watch and a switchable tracking device can be used in concert to track a user's movements. As shown in FIG. 7, a watch 200 and a switchable tracking device 400 can be separate devices that provide detectable features for tracking each of a user's wrists, hands, arms, or other limbs.

FIG. 7 illustrates a perspective view of the watch 200, including the watch body 210 and a watch band 240. It will be recognized that the watch 200 can optionally have the same features as the watch 200 of FIG. 2 and/or the watch 200 of FIG. 4. Accordingly, a separate description of such features is not provided herein. As further shown in FIG. 7, the watch 200 can include the watch indicators 250 described herein with respect to the watch 200 of FIG. 2 and the watch engagement elements 270 described herein with respect to the watch 200 of FIG. 4.

FIG. 7 further illustrates a perspective view of a switchable tracking device 400, including a switchable tracking device band 440. It will be recognized that the switchable tracking device 400 can optionally have the same features as the switchable tracking device 400 of FIG. 4. Accordingly, a separate description of such features is not provided herein.

As shown in FIGS. 8 and 9, the watch 200 and the switchable tracking device 400 can be used in concert to track each of a user's wrists, hands, arms, or other limbs. For example, as shown in FIG. 8, the watch 200 and the switchable tracking device 400 can be worn on a first wrist 20 of the user. In this configuration, the switchable tracking device 400 can at least partially overlapped the watch 200 to minimize the amount of coverage on the user. For example, the switchable tracking device 400 can cover at least some of the watch band 240 of the watch 200. The watch body 210 can remain uncovered by the switchable tracking device 400 (e.g., within a gap formed by the switchable tracking device band 440), so that the user can provide inputs and/or receive output at the watch body 210. Corresponding engagement elements can couple the switchable tracking device 400 to the watch 200 until released by a user. Additionally or alternatively, the switchable tracking device 400 and the watch 200 can be operably connected by a communication interface that facilitates power and/or information exchange there between. Because this configuration is one in which the wrists are not both tracked, the indicators of the watch 200 and the switchable tracking device 400 can remain dormant. For example, one or both of the watch 200 and the switchable tracking device 400 can detect the proximity of the other and disable the activity of the indicators thereof to conserve power. Such an operation can be automated and/or based on user input.

As shown in FIG. 9, the switchable tracking device 400 can be removed from the watch 200 and/or the first wrist 20 of the user. The switchable tracking device 400 can further be coupled to the second wrist 22 of the user. Because this configuration is one in which the wrists are both tracked, the indicators of the watch 200 and the switchable tracking device 400 can be active. For example, one or both of the watch 200 and the switchable tracking device 400 can detect the absence of the other and activate the indicators thereof to provide detection capabilities. Such an operation can be automated and/or based on user input.

While in the configuration illustrated in FIG. 9, the watch indicators 250 of the watch 200 can be detected by an external device (e.g., a head-mountable device) to determine a characteristic (e.g., position and/or orientation) of the first wrist 20.

The switchable tracking device indicators 450 of the switchable tracking device 400 can be detected by an external device (e.g., a head-mountable device) to determine a characteristic (e.g., position and/or orientation) of the second wrist 22. The watch indicators 250 and the switchable tracking device indicators 450 can be arranged in a manner that is detectable by a head-mountable device. Furthermore, the arrangement of the watch indicators 250 and the switchable tracking device indicators 450 can be recognizable by the head-mountable device in a manner that identifies each of the switchable tracking device 400 and the watch 200. As such, an arrangement and/or output of the switchable tracking device indicators 450 on the switchable tracking device 400 can be different from an arrangement and/or output of watch indicators 250 on the watch 200. Accordingly, the arrangement and/or output can be used as an identifier to allow a head-mountable device to identify the switchable tracking device 400 and the watch 200. The detected identities and/or characteristics of the switchable tracking device 400, watch 200, and/or wrists 20 and 22 can be detected and interpreted as user inputs for operation of the external device, as described herein with respect to the indicators and devices of FIGS. 3 and 6.

To further facilitate the detections described herein, the watch 200, the wrist tracking device 300, and/or the switchable tracking device 400 can include sensors and/or other feedback devices. For example, the watch 200, the wrist tracking device 300, and/or the switchable tracking device 400 can include one or more components for receiving gesture input from the same hand on which the corresponding device is worn. Such components can include cameras, electromyography (EMG) sensors, pressure sensors, strain gauges, accelerometers, gyroscopes, lidar components, proximity sensors, ultrasound sensors, radio-frequency (RF) sensors, and/or platinum optical intensity sensors. The components can be disposed on or within a band and/or a body of the corresponding device.

The components can generate input signals responsive to physical movements and/or positioning of the user's hand, wrist, arm, and/or other limb. To generate the input signals, the components detect movement and/or positioning of external and/or internal structures of the user's hand, wrist, arm, and/or other limb during the physical movements of the user's hand, wrist, arm, and/or other limb. For example, light reflected from or generated by the skin of the user's hand can be detected by one or more cameras or other optical or infrared sensors. Multiple cameras can be used to each capture images of a portion of the user's hand. The captured images can be used to generate a three-dimensional model of the user's hand to determine a hand position. Images can be captured at each of multiple times while the user moves their hand for hand or finger motion detection.

As another example, electrical signals generated by the muscles, tendons or bones of the user can be detected (e.g., by electromyography sensors). As another example, ultrasonic signals generated by the corresponding device and reflected from the muscles, tendons or bones of the user can be detected by an ultrasonic sensor. EMG sensors, ultrasonic sensors, and/or other sensors may generate signals that can be combined with camera images to identify a position or a motion of the user's hand, wrist or arm.

As another example, electrical signals generated by the muscles, tendons or bones of the user can be detected (e.g., by electromyography sensors). As another example, ultrasonic signals generated by the corresponding device and reflected from the muscles, tendons or bones of the user can be detected by an ultrasonic sensor. EMG sensors, ultrasonic sensors, and/or other sensors may generate signals that can be combined with camera images to identify a position or a motion of the user's hand, wrist or arm.

Figure 10:
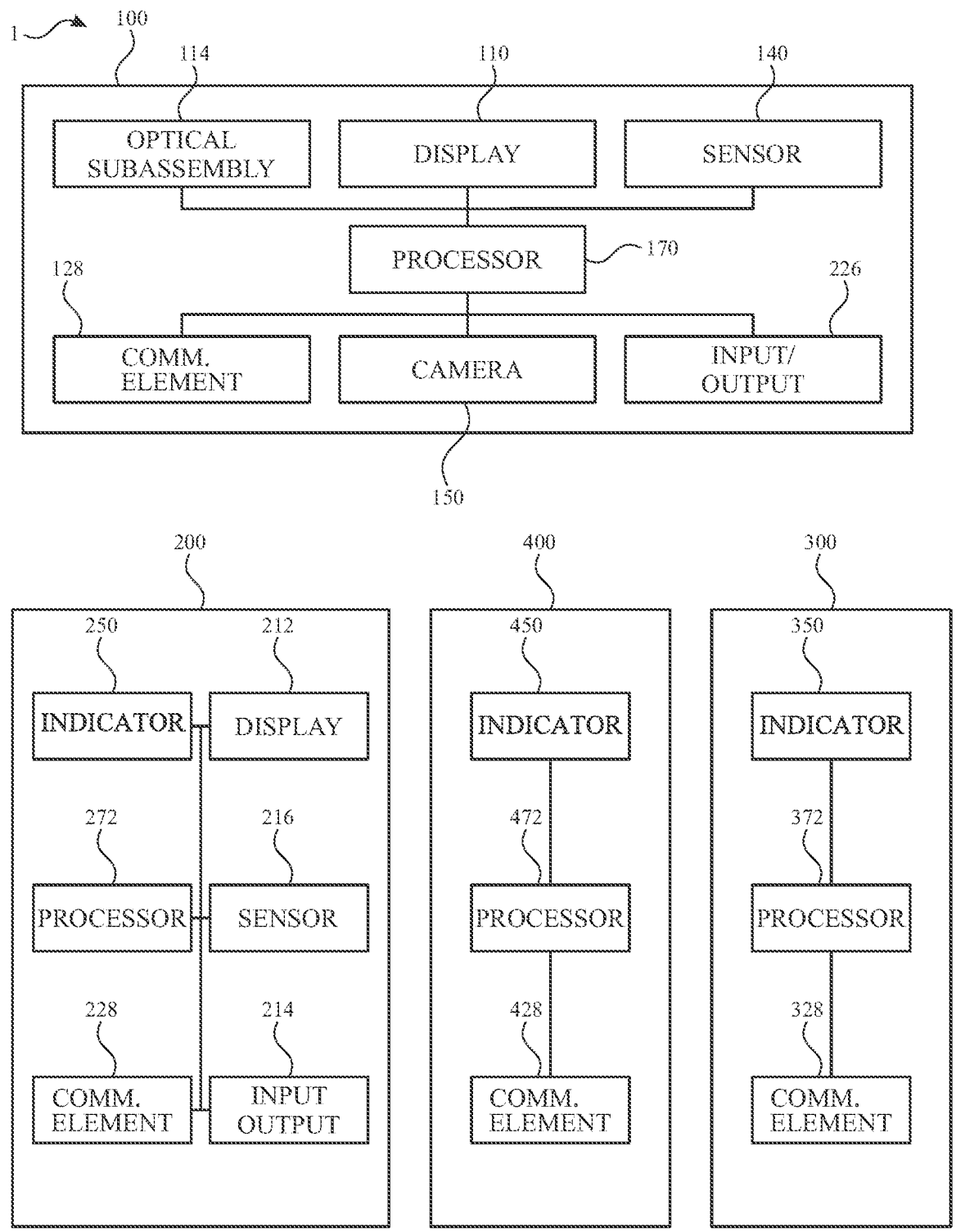
FIG. 10 illustrates a block diagram of a system including a head-mountable device, a watch, a switchable tracking device, and a wrist tracking device, in accordance with some embodiments of the present disclosure.

Referring now to FIG. 10, components of a system can be provided and operatively connected to achieve the performance described herein. FIG. 10 shows a simplified block diagram of a head-mountable device 100, a watch 200, a switchable tracking device 400, and a wrist tracking device 300 in accordance with one or more embodiments of the disclosure.

As shown in FIG. 10, the head-mountable device 100 can include a processor 170 with one or more processing units that include or are configured to access a memory having instructions stored thereon. The instructions or computer programs may be configured to perform one or more of the operations or functions described with respect to the head-mountable device 100. The processor 170 can be implemented as any electronic device capable of processing, receiving, or transmitting data or instructions. For example, the processor 170 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the head-mountable device 100. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The head-mountable device 100 can further include a display 110 for displaying visual information for a user. The display 110 can provide visual (e.g., image or video) output. The display 110 can be or include an opaque, transparent, and/or translucent display. The display 110 may have a transparent or translucent medium through which light representative of images is directed to a user's eyes. The display 110 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly 114 configured to help optically adjust and correctly project the image based content being displayed by the display 110 for close up viewing. The optical subassembly 114 can include one or more lenses, mirrors, or other optical devices.

The head-mountable device 100 can include the camera 150 for capturing a view of an environment external to the head-mountable device 100. The camera 150 can include an optical sensor, such as a photodiode or a photodiode array. Additionally or alternatively, the camera 150 can include one or more of various types of optical sensors that are arranged in various configurations for detecting user inputs described herein. The camera 150 may be configured to capture an image of a scene or subject located within a field of view of the camera 150. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The camera 150 can provide one or more windows (e.g., opening, transmission medium, and/or lens) to transmit light for image capture and/or detection. The window can include a light transmitting material. The window can provide optical effects for the transmitted light. For example, the window can include one or more optical components disposed relative to an image sensor, including, for example, a lens, a diffuser, a filter, a shutter, and the like. It will also be understood that the head-mountable device 100 can include any number of cameras. The cameras can be positioned and oriented to capture different views. For example, one camera can capture an image of an object from one perspective and another camera can capture an image of an object from another perspective. Additionally or alternatively, the other camera can capture an image of an object that is not captured by the first camera.

Additionally or alternatively, the head-mountable device 100 can include one or more sensors 140. Such sensors 140 can include an environmental sensor that detects one or more conditions in an environment of the head-mountable device 100. For example, an environmental sensor can include an imaging device, a thermal sensor, a proximity sensor, a motion sensor, a humidity sensor, a chemical sensor, a light sensor, and/or a UV sensor. An environmental sensor can be configured to sense substantially any type of characteristic such as, but not limited to, images, pressure, light, touch, force, temperature, position, motion, and so on. For example, the environmental sensor may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The sensor 140 can provide information regarding a characteristic of the head-mountable device 100, such as inertial angles thereof. For example, the sensor 140 can include a six-degrees of freedom IMU that calculates the head-mountable device's position, velocity, and/or acceleration based on six degrees of freedom (x, y, z, Ox, $0_y$, and Ow). The IMU can include one or more of an accelerometer, a gyroscope, and/or a magnetometer. Additionally or alternatively, the head-mountable device 100 can detect motion characteristics of the head-mountable device 100 with one or more other motion sensors, such as an accelerometer, a gyroscope, a global positioning sensor, a tilt sensor, and so on for detecting movement and acceleration of the head-mountable device 100. The IMU can provide data to the processor 170 for processing.

The sensor 140 can include one or more user sensors for tracking features of the user wearing the head-mountable device 100. For example, a user sensor can perform facial feature detection, facial movement detection, facial recognition, eye tracking, user mood detection, user emotion detection, voice detection, etc. Such eye tracking may be used to determine a location of information to be displayed on the display 110 and/or a portion (e.g., object) of a view to be analyzed by the head-mountable device 100. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The head-mountable device 100 can include an input/output component 226, which can include any suitable component for allowing a user to provide input and/or receive output. The input/output component 226 can include, for example, one or more buttons, crowns, keys, dials, trackpads, microphones, haptic devices, and the like. Additionally or alternatively, the input/output component 226 can include any suitable component for connecting the head-mountable device 100 to other devices. Suitable components can include, for example, audio/video jacks, data connectors, or any additional or alternative input/output components.

The head-mountable device 100 can include a communication element 128 for communicating with one or more servers or other devices using any suitable communications protocol. For example, the communication element 128 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication element 128 can also include an antenna for transmitting and receiving electromagnetic signals.

The head-mountable device 100 can include a battery, which can charge and/or power components of the head-mountable device 100. The battery can also charge and/or power components connected to the head-mountable device 100.

The head-mountable device 100 can include a microphone that can be operably connected to the processor 170 for detection of sound levels and communication of detections for further processing, as described further herein. The head-mountable device 100 can include the speakers that can be operably connected to the processor 170 for control of speaker output, including sound levels, as described further herein.

FIG. 10 also shows a simplified block diagram of the watch 200 in accordance with one or more embodiments of the disclosure. As shown in FIG. 10, the watch 200 can include the display 212, the input/output component 214, the sensor 216 and/or the watch indicators 250, as described herein. The watch 200 can further include a processor 272 with one or more processing units that include or are configured to access a memory having instructions stored thereon. The watch 200 can further include a watch communication element 228 configured to communicate and/or transfer power between the watch 200 and other devices via a wired and/or wireless connection, as described herein. The watch 200 can include a battery, which can charge and/or power components of the watch 200. The battery can also charge and/or power components connected to the watch 200.

FIG. 10 also shows a simplified block diagram of the wrist tracking device 300 in accordance with one or more embodiments of the disclosure. As shown in FIG. 10, the wrist tracking device 300 can include a processor 372 with one or more processing units that include or are configured to access a memory having instructions stored thereon. The wrist tracking device 300 can further include a wrist tracking device communication element 328 configured to communicate and/or transfer power between the wrist tracking device 300 and other devices via a wired and/or wireless connection, as described herein.

FIG. 10 also shows a simplified block diagram of the switchable tracking device 400 in accordance with one or more embodiments of the disclosure. As shown in FIG. 10, the switchable tracking device 400 can include a processor 472 with one or more processing units that include or are configured to access a memory having instructions stored thereon. The switchable tracking device 400 can further include a switchable tracking device communication element 428 configured to communicate and/or transfer power between the switchable tracking device 400 and other devices via a wired and/or wireless connection, as described herein. Accordingly, embodiments of the present disclosure provide a system including a head-mountable device that can be operated with other devices worn on wrists, arms, hands, and/or other limbs of a user. Such devices can provide indicators that allow a head-mountable device to determine both an identity and a characteristic (e.g., position, orientation, distance, etc.) of the devices and therefore the user. The information regarding the tracking devices and/or the hands can be used to produce a virtual representation of the hands or otherwise be used to receive and interpret gestures as user input. The devices that facilitate such tracking can be worn in a variety or arrangements depending on whether the tracking is to be performed. As such, they can be compactly stored in a manner that allows them to be readily accessible for deployment.

Various examples of aspects of the disclosure are described below as clauses for convenience. These are provided as examples, and do not limit the subject technology.

Clause A: a system comprising: a wrist tracking device comprising: a wrist tracking device band; wrist tracking device indicators; and a wrist tracking device engagement element; a switchable tracking device comprising: a switchable tracking device band; switchable tracking device indicators; and a switchable tracking device engagement element, wherein the switchable tracking device is switchable between: a first configuration in which the switchable tracking device is securely coupled to the wrist tracking device on a first wrist of a user, with the switchable tracking device engagement element engaging the wrist tracking device engagement element; and a second configuration in which the switchable tracking device is securely coupled to another wrist of the user.

Clause B: a system comprising: a watch comprising: a body having a display; and a watch band comprising a watch engagement element; and a wrist tracking device comprising: a wrist tracking device band; wrist tracking device indicators distributed on an outer surface of the wrist tracking device band; and a wrist tracking device engagement element; a switchable tracking device comprising: a switchable tracking device band; switchable tracking device indicators distributed on an outer surface of the switchable tracking device band; and a switchable tracking device engagement element, wherein the switchable tracking device is switchable between: a first configuration in which the switchable tracking device is securely coupled to the wrist tracking device with the switchable tracking device engagement element engaging the wrist tracking device engagement element; and a second configuration in which the switchable tracking device is securely coupled to the watch with the switchable tracking device engagement element engaging the watch engagement element while in the second configuration.

Clause C: a system comprising: a watch comprising: a body having a display; and a watch band comprising a watch engagement element; and watch indicators; and a switchable tracking device comprising: a switchable tracking device band; switchable tracking device indicators; and a switchable tracking device engagement element, wherein the switchable tracking device is switchable between: a first configuration in which the switchable tracking device is securely coupled to the watch on a first wrist, with the switchable tracking device engagement element engaging the watch engagement element; and a second configuration in which the switchable tracking device is securely coupled to a second wrist.

One or more of the above clauses can include one or more of the features described below. It is noted that any of the following clauses may be combined in any combination with each other, and placed into a respective independent clause, e.g., clause A, B, or C.

Clause 1: a head-mountable device comprising: a camera for capturing a view of the wrist tracking device indicators and the switchable tracking device indicators; a processor configured to determine, based on the view of the wrist tracking device indicators and the switchable tracking device indicators, a characteristic of the wrist tracking device and a characteristic of the switchable tracking device; and a display screen configured to show a representation of a user's hands based on the characteristic of the wrist tracking device and the characteristic of the switchable tracking device.

Clause 2: while the switchable tracking device is in the first configuration, the switchable tracking device engages the wrist tracking device while covering the wrist tracking device indicators.

Clause 3: the wrist tracking device indicators and the switchable tracking device indicators each comprise an infrared light emitter.

Clause 4: the wrist tracking device further comprises a wrist tracking device battery configured to power the wrist tracking device indicators; and the switchable tracking device further comprises a switchable tracking device battery configured to power the switchable tracking device indicators.

Clause 5: while in the first configuration, the wrist tracking device and the switchable tracking device are configured to transfer power between the wrist tracking device battery and the switchable tracking device battery.

Clause 6: a head-mountable device comprising: a camera for capturing a view of the wrist tracking device indicators and the switchable tracking device indicators; a processor configured to determine, based on the view of the wrist tracking device indicators and the switchable tracking device indicators, a characteristic of the wrist tracking device and a characteristic of the switchable tracking device; and a display screen configured to show a representation of a user's hands based on the characteristic of the wrist tracking device and the characteristic of the switchable tracking device.

Clause 7: while the switchable tracking device is in the second configuration, the switchable tracking device engages the watch band without covering the display.

Clause 8: the watch band does not include indicators.

Clause 9: the wrist tracking device indicators and the switchable tracking device indicators each comprise an infrared light emitter.

Clause 10: the wrist tracking device further comprises a wrist tracking device battery configured to power the wrist tracking device indicators; and the switchable tracking device further comprises a switchable tracking device battery configured to power the switchable tracking device indicators.

Clause 11: while in the first configuration, the wrist tracking device and the switchable tracking device are configured to transfer power between the wrist tracking device battery and the switchable tracking device battery.

Clause 12: a head-mountable device comprising: a camera for capturing a view of the watch indicators and the switchable tracking device indicators; a processor configured to determine, based on the view of the watch indicators and the switchable tracking device indicators, a characteristic of the watch and a characteristic of the switchable tracking device; and a display screen configured to show a representation of a user's hands based on the characteristic of the watch and the characteristic of the switchable tracking device.

Clause 13: while the switchable tracking device is in the first configuration, the switchable tracking device engages the watch band without covering the display.

Clause 14: while the switchable tracking device is in the first configuration, the switchable tracking device engages the watch band while covering the watch indicators.

Clause 15: the watch indicators and the switchable tracking device indicators each comprise an infrared light emitter.

Clause 16: the watch further comprises a watch battery configured to power the watch indicators; and the switchable tracking device further comprises a switchable tracking device battery configured to power the switchable tracking device indicators.

Clause 17: while in the first configuration, the watch and the switchable tracking device are configured to transfer power between the watch battery and the switchable tracking device battery.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A system, the system comprising:
   a wrist tracking device comprising:
      a wrist tracking device band;
      wrist tracking device indicators, the wrist tracking device indicators being detectable by a camera of a head-mountable device; and
      a wrist tracking device engagement element;
   a switchable tracking device comprising:
      a switchable tracking device band;
      switchable tracking device indicators, the switchable tracking device indicators being detectable by the camera of the head-mountable device; and
      a switchable tracking device engagement element, wherein the switchable tracking device is switchable between:
         a first configuration in which the switchable tracking device is securely coupled to the wrist tracking device on a first wrist of a user by an engagement between the switchable tracking device engagement element and the wrist tracking device engagement element to releasably lock the switchable tracking device to the wrist tracking device; and
         a second configuration in which the switchable tracking device is securely coupled to another wrist of the user.

2. The system of claim 1, further comprising:
   the head-mountable device comprising:
      the camera for capturing a view of the wrist tracking device indicators and the switchable tracking device indicators;
      a processor configured to determine, based on the view of the wrist tracking device indicators and the switchable tracking device indicators, a characteristic of the wrist tracking device and a characteristic of the switchable tracking device; and a display screen configured to show a representation of a user's hands based on the characteristic of the wrist tracking device and the characteristic of the switchable tracking device.

3. The system of claim 1, wherein, while the switchable tracking device is in the first configuration, the switchable tracking device engages the wrist tracking device while covering the wrist tracking device indicators.

4. The system of claim 1, wherein the wrist tracking device indicators and the switchable tracking device indicators each comprise an infrared light emitter.

5. The system of claim 1, wherein:
the wrist tracking device further comprises a wrist tracking device battery configured to power the wrist tracking device indicators; and
the switchable tracking device further comprises a switchable tracking device battery configured to power the switchable tracking device indicators.

6. The system of claim 5, wherein, while in the first configuration, the wrist tracking device and the switchable tracking device are configured to transfer power between the wrist tracking device battery and the switchable tracking device battery.

7. A system, the system comprising:
a watch comprising:
a body having a display; and
a watch band comprising a watch engagement element; and
a wrist tracking device comprising:
a wrist tracking device band;
wrist tracking device indicators distributed on an outer surface of the wrist tracking device band, the wrist tracking device indicators being detectable by a camera of a head-mountable device; and
a wrist tracking device engagement element;
a switchable tracking device comprising:
a switchable tracking device band;
switchable tracking device indicators distributed on an outer surface of the switchable tracking device band, the switchable tracking device indicators being detectable by the camera of the head-mountable device; and
a switchable tracking device engagement element, wherein the switchable tracking device is switchable between:
a first configuration in which the switchable tracking device is securely coupled to the wrist tracking device with the switchable tracking device engagement element engaging the wrist tracking device engagement element to releasably lock the switchable tracking device to the wrist tracking device; and
a second configuration in which the switchable tracking device is securely coupled to the watch with the switchable tracking device engagement element engaging the watch engagement element while in the second configuration.

8. The system of claim 7, further comprising:
the head-mountable device comprising:
the camera for capturing a view of the wrist tracking device indicators and the switchable tracking device indicators;
a processor configured to determine, based on the view of the wrist tracking device indicators and the switchable tracking device indicators, a characteristic of the wrist tracking device and a characteristic of the switchable tracking device; and
a display screen configured to show a representation of a user's hands based on the characteristic of the wrist tracking device and the characteristic of the switchable tracking device.

9. The system of claim 7, wherein, while the switchable tracking device is in the second configuration, the switchable tracking device engages the watch band without covering the display.

10. The system of claim 7, wherein the watch band does not include indicators.

11. The system of claim 7, wherein the wrist tracking device indicators and the switchable tracking device indicators each comprise an infrared light emitter.

12. The system of claim 7, wherein:
the wrist tracking device further comprises a wrist tracking device battery configured to power the wrist tracking device indicators; and
the switchable tracking device further comprises a switchable tracking device battery configured to power the switchable tracking device indicators.

13. The system of claim 12, wherein, while in the first configuration, the wrist tracking device and the switchable tracking device are configured to transfer power between the wrist tracking device battery and the switchable tracking device battery.

14. A system, the system comprising:
a watch comprising:
a body having a display;
a watch band comprising a watch engagement element; and
watch indicators, the watch indicators being detectable by a camera of the head-mountable device; and
a switchable tracking device comprising:
a switchable tracking device band;
switchable tracking device indicators, the switchable tracking device indicators being detectable by the camera of a head-mountable device; and
a switchable tracking device engagement element, wherein the switchable tracking device is switchable between:
a first configuration in which the switchable tracking device is securely coupled to the watch on a first wrist, with the switchable tracking device engagement element engaging the watch engagement element to releasably lock the switchable tracking device to the watch; and
a second configuration in which the switchable tracking device is securely coupled to a second wrist.

15. The system of claim 14, further comprising:
the head-mountable device comprising:
the camera for capturing a view of the watch indicators and the switchable tracking device indicators;
a processor configured to determine, based on the view of the watch indicators and the switchable tracking device indicators, a characteristic of the watch and a characteristic of the switchable tracking device; and
a display screen configured to show a representation of a user's hands based on the characteristic of the watch and the characteristic of the switchable tracking device.

16. The system of claim 14, wherein, while the switchable tracking device is in the first configuration, the switchable tracking device engages the watch band without covering the display.

17. The system of claim 14, wherein, while the switchable tracking device is in the first configuration, the switchable tracking device engages the watch band while covering the watch indicators.

18. The system of claim 14, wherein the watch indicators and the switchable tracking device indicators each comprise an infrared light emitter.

19. The system of claim 14, wherein:
the watch further comprises a watch battery configured to power the watch indicators; and
the switchable tracking device further comprises a switchable tracking device battery configured to power the switchable tracking device indicators.

20. The system of claim 19, wherein, while in the first configuration, the watch and the switchable tracking device are configured to transfer power between the watch battery and the switchable tracking device battery.

\* \* \* \* \*

UNITED STATES PATENT AND TRADEMARK OFFICE
CERTIFICATE OF CORRECTION

| | |
|---|---|
| PATENT NO. | : 11,175,734 B1 |
| APPLICATION NO. | : 16/983999 |
| DATED | : November 16, 2021 |
| INVENTOR(S) | : Muhammad F. Hossain et al. |

It is certified that error appears in the above-identified patent and that said Letters Patent is hereby corrected as shown below:

On the Title Page

Item (73) Assignee: Replace "Apple Inc," with --Apple Inc.,--.

Signed and Sealed this
Seventh Day of February, 2023

*Katherine Kelly Vidal*

Katherine Kelly Vidal
*Director of the United States Patent and Trademark Office*